US009142125B1

(12) United States Patent
Lu

(10) Patent No.: US 9,142,125 B1
(45) Date of Patent: Sep. 22, 2015

(54) TRAFFIC PREDICTION USING PRECIPITATION

(71) Applicant: Haiyun Lu, Singapore (SG)

(72) Inventor: Haiyun Lu, Singapore (SG)

(73) Assignee: SAP SE (DE)

( * ) Notice: Subject to any disclaimer, the term of this patent is extended or adjusted under 35 U.S.C. 154(b) by 0 days.

(21) Appl. No.: 14/283,230

(22) Filed: May 21, 2014

(51) Int. Cl.
*G06F 19/00* (2011.01)
*G08G 1/123* (2006.01)
*G08G 1/048* (2006.01)
*G08G 1/01* (2006.01)

(52) U.S. Cl.
CPC .............. *G08G 1/048* (2013.01); *G08G 1/0129* (2013.01)

(58) Field of Classification Search
CPC ............ H03H 15/023; H03H 17/0621; H03H 17/0657; H03H 9/6403; H04L 1/0033; H04L 27/368; Y02B 60/50
USPC ........................... 701/400-541; 340/988-996
See application file for complete search history.

(56) References Cited

U.S. PATENT DOCUMENTS

| | | | | |
|---|---|---|---|---|
| 5,235,534 | A * | 8/1993 | Potter | 708/300 |
| 7,463,973 | B2 * | 12/2008 | Okude et al. | 701/423 |

OTHER PUBLICATIONS

Robert Mutel, University of Iowa, Deptt. of Physics and Astronomy, MathCAD astronomy worksheets (Linear fitting with Outlier: Chauvenet's criterion) (weighted linera model fitting (variable sigma) tutorial worksheet.*

Daniel J. Dailey, The Use of Weather Data to Predict Non-recurring Traffic Congestion, Technical Report, Sep. 2006, pp. i-viii and 1-18, Agreement T2695, Task 54, Washington.

Darcin Akin et al., Impacts of Weather on Traffic Flow Characteristics of Urban Freeways in Istanbul, Procedia Social and Behavioral Sciences 16, 2011, pp. 89-99, Elsevier Ltd.

Mark J. Koetse et al., The impact of climate change and weather on transport: An overview of empirical findings, Transportation Research Part D 14, 2009, pp. 205-221, Elsevier Ltd.

Kevin Keay et al., The association of rainfall and other weather variables with road traffic volume in Melbourne, Australia, Accident Analysis and Prevention 37, 2005, pp. 109-124, Elsevier Ltd.

Daniel Eisenberg, The mixed effects of precipitation on traffic crashes, Accident Analysis and Prevention 36, 2004, pp. 637-647, Elsevier Ltd.

R. Keith Oswald et al., Traffic Flow Forecasting Using Approximate Nearest Neighbor Nonparametric Regression, Research Report No. UVACTS-15-13-7, Dec. 2001, pp. 25-38, Center for Transportation Studies at the University of Virginia.

Weizhong Zheng et al., Short-Term Freeway Traffic Flow Prediction: Bayesian Combined Neural Network Approach, Feb. 2006, pp. 114-121, Journal of Transportation Engineering, ASCE.

H. M. Zhang, Recursive Prediction of Traffic Conditions with Neural Network Models, Nov./Dec. 2000, pp. 472-481, Journal of Transportation Engineering, ASCE.

Guoqiang Yu et al., Switching Arima Model Based Forecasting for Traffic Flow, 2004, pp. 429-432, vol. 2.

(Continued)

*Primary Examiner* — Muhammad Shafi
(74) *Attorney, Agent, or Firm* — Horizon IP Pte. Ltd.

(57) ABSTRACT

Described herein is a framework to facilitate traffic prediction. In accordance with one aspect, training data including historical traffic information and precipitation data is received. An impulse response function may be determined based on the training data. One or more traffic parameters may be predicted by calculating a weighted linear system model based on the impulse response function.

17 Claims, 8 Drawing Sheets

804

(56) References Cited

OTHER PUBLICATIONS

Billy M. Williams et al., Modeling and Forecasting Vehicular Traffic Flow as a Seasonal ARIMA Process: Theoretical Basis and Empirical Results, Nov./Dec. 2003, pp. 664-672, Journal of Transportation Engineering, ASCE.
Anthony Stathopoulos et al., A multivariate state space approach for urban traffic flow modeling and prediction, Transportation Research Part C 11, 2003, pp. 121-135, Elsevier Science Ltd.
Mei Chen et al., Dynamic Freeway Travel Time Prediction Using Probe Vehicle Data: Link-Based vs. Path-based, Jan. 7-11, 2001, pp. 1-13, TRB Paper No. 01-2887, Washington.
Jiasong Zhu, A self-learning short-term traffic forecasting system through dynamic hybrid approach, 2007, pp. 1-15, The University of Hong Kong.
S. Mehdi Hashemi et al., Predicting the Next State of Traffic by Data Mining Classification Techniques, Fall 2012, pp. 180-192, vol. 1, No. 3, International Journal of Smart Electrical Engineering.
Julia B Edwards, The temporal distribution of road accidents in adverse weather, 1999, pp. 59-68, Meteorol. Appl. 6, UK.

* cited by examiner

802

804

TRAFFIC PREDICTION USING PRECIPITATION

TECHNICAL FIELD

The present disclosure relates generally to computer systems, and more specifically, to a framework for traffic prediction using precipitation.

BACKGROUND

Traffic forecasting is an important component of an intelligent transportation system in a smart city. Research efforts have been made to manage traffic congestion using various traffic prediction models and methods. Generally, traffic prediction problems can be classified into two categories with respect to time scale: long-term and short-term. Long-term prediction provides monthly or even yearly information of traffic states, and is used for long-term transportation planning. Short-term prediction, on the other hand, provides traffic forecasts for the near future, such as 15 minutes later. It can be used by experts to guide traffic flow and to manage congestion. It may also be made available to commuters to help them plan their trips wisely. Short-term traffic prediction provides estimates of future key traffic parameters, such as speed, flow, occupancy or travel time, with a forecasting horizon typically ranging from five to thirty minutes at specific locations, given real-time and historical traffic data from relevant surveillance stations.

Bad weather conditions, such as rain, snow, fog, ice, flooding, wind and high temperature, generally result in more accidents on road. Heavy precipitation conditions may also impact traffic speed, capacity, volume, intensity, flow and travel time. Heavy rainfall may decrease the visibility and causes wet surface on roads, so road users will slow down their vehicles in order to drive safely. Although the impact of rainfall on traffic is generally recognized on an anecdotal basis, current traffic prediction systems do not provide a quantitative approach to forecasting traffic based on rainfall data.

SUMMARY

A framework for traffic prediction is described herein. In accordance with one aspect, training data including historical traffic information and precipitation data is received. An impulse response function may be determined based on the training data. One or more traffic parameters may be predicted by calculating a weighted linear system model based on the impulse response function.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for facilitating traffic prediction is described herein. In accordance with some implementations, predictions of short-term travel times are determined by using precipitation data. Precipitation generally refers to any products of condensation of atmospheric water vapor that falls under gravity, such as rain, sleet, snow or hail. For example, in countries with a tropical rainforest climate (e.g., Singapore), rainfall data may be used to generate predictions of travel time on the freeway or expressway. In some implementations, an impulse response function is derived from training data to quantitatively relate the precipitation rate (e.g., rainfall rate) to a traffic parameter (e.g., travel time). A weighted linear system may be used to perform the prediction. Experimental results show that the present framework achieved lower error rates compared to other baseline approaches.

It should be appreciated that the framework described herein may be implemented as a method, a computer-controlled apparatus, a computer process, a computing system, or as an article of manufacture such as a computer-usable medium. These and various other features will be apparent from the following description.

Figure 1:
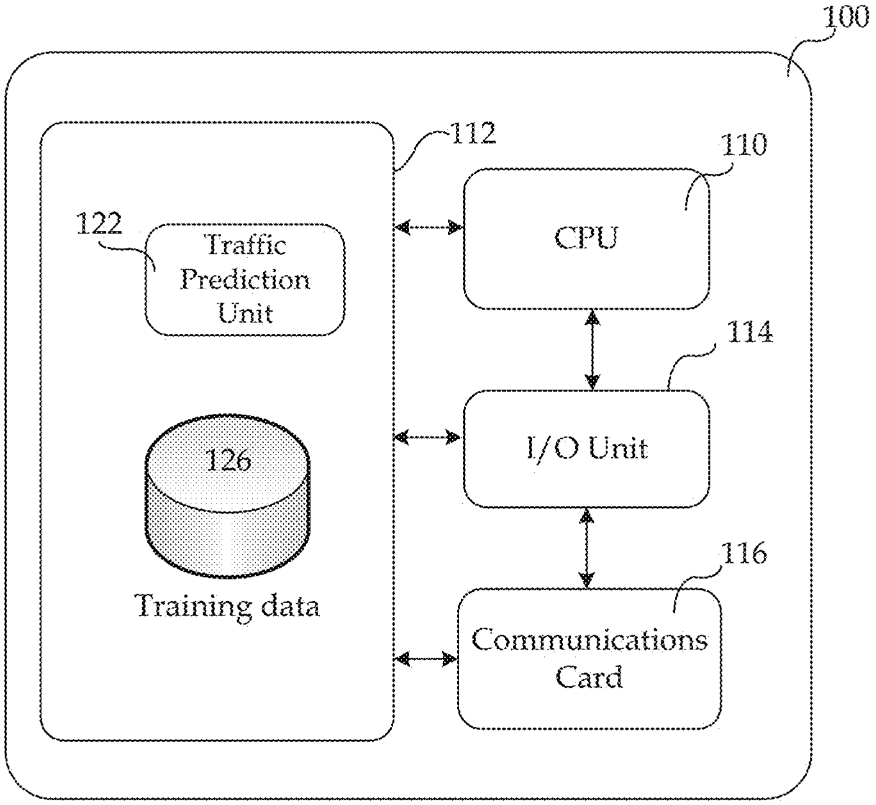
FIG. 1 is a block diagram illustrating an exemplary computer system.

FIG. 1 is a block diagram illustrating an exemplary computer system 100 in accordance with one aspect of the present framework. Computer system 100 can be any type of computing device capable of responding to and executing instructions in a defined manner, such as a workstation, a server, a portable laptop computer, another portable device, a minicomputer, a mainframe computer, a storage system, a dedicated digital appliance, a device, a component, other equipment, or some combination of these. Computer system 100 may include a central processing unit (CPU) 110, an input/output (I/O) unit 114, a memory module 112 and a communications card or device 116 (e.g., modem and/or network adapter) for exchanging data with a network (e.g., local area network (LAN), wide area network (WAN), Internet, etc.). It should be appreciated that the different components and subcomponents of the computer system 100 may be located or executed on different machines or systems. For example, a component may be executed on many computer systems connected via the network at the same time (i.e., cloud computing).

Memory module 112 of the computer system 100 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by CPU 110. As such, the computer system 100 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 of the computer system 100 includes one or more components for implementing the techniques described herein, such as traffic prediction unit 122 and training data 126. It should be appreciated that some or all of these exemplary components may also be implemented in another computer system (e.g., user or client device).

Figure 2:
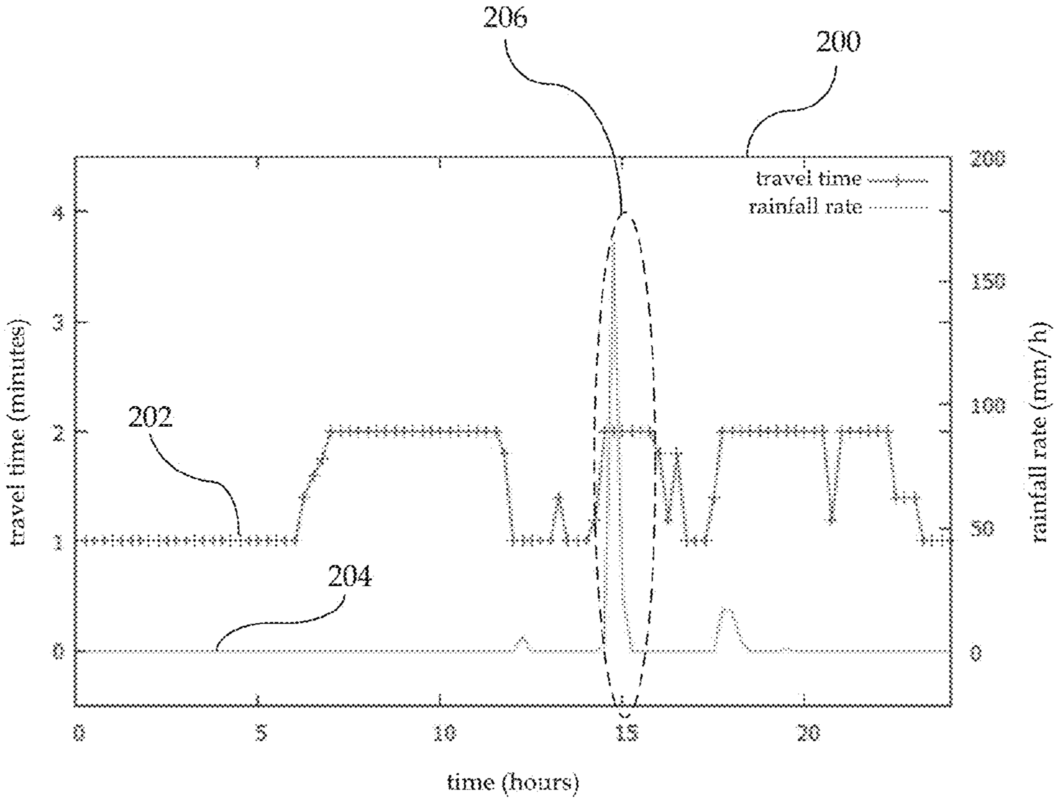
FIG. 2 shows a plot of rainfall rate and travel time for a segment of an expressway on a typical weekday.

Traffic prediction unit 122 may make determinations based on an assumption that there is a quantitative causal correlation between travel time and precipitation rate. In an exemplary situation, when there is heavy rain, drivers may slow down to keep a safe distance between vehicles. FIG. 2 shows a plot 200 of rainfall rate and travel time for a segment of an expressway on a typical weekday. The first graph 202 shows travel time, while the second graph 204 shows rainfall rate. As can be observed from the first graph 202, travel time increased during morning and evening peak hours, which is generally expected due to vehicles commuting to and from workplaces. However, it can also be observed that travel time increased around 15:00 (off peak hour) on the same day, which overlapped with a high rainfall period at around the same time (see 206).

To demonstrate the impact of the rainfall on traffic, the cross-correlation $R_{\delta r}$ between travel time and rainfall rate may be computed as follows:

$$R_{\delta r} = \frac{1}{T}\int_0^T \delta(t)r(t+\tau)dt \qquad (1)$$

wherein T is 24 hours, t is time, δ(t) is the deviation from normal travel time and r(t) is the rainfall rate. The deviation δ(t) may be computed as follows:

$$\delta(t)=y(t)-\bar{y}(t) \qquad (2)$$

wherein y(t) is the travel time at time t and $\bar{y}(t)$ is the historical average of the travel time.

The peak value of the cross-correlation is located at the delay τ necessary to align the two time series y(t) and $\bar{y}(t)$.

Figure 3:
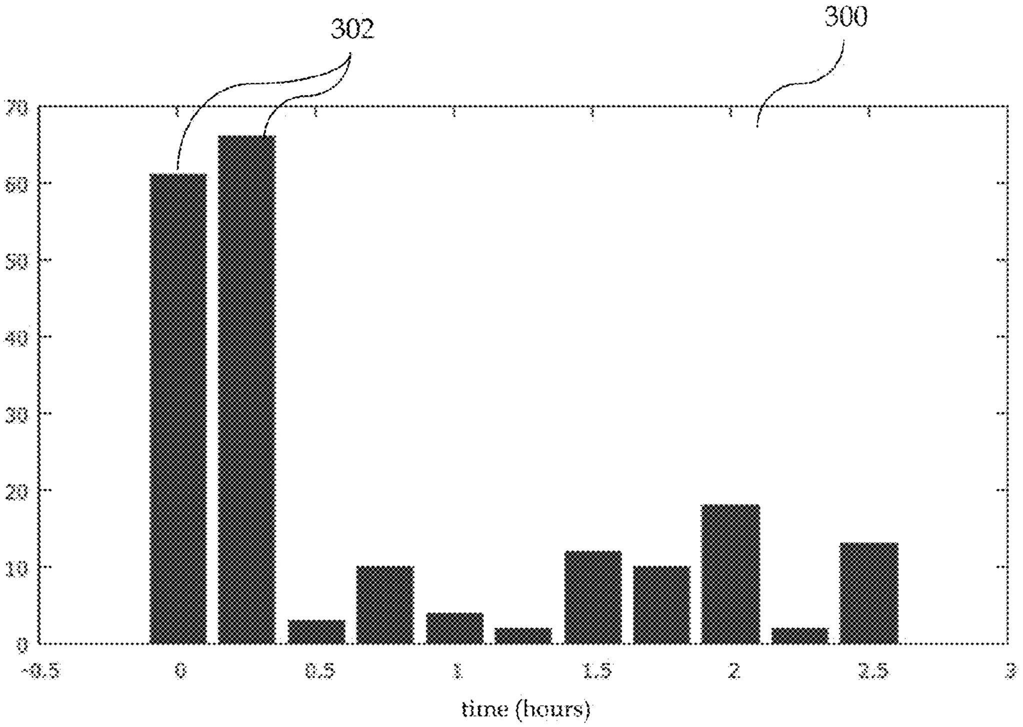
FIG. 3 shows a histogram of peak values of the cross-correlation between travel time and rainfall rate.

FIG. 3 shows a histogram 300 of peak values of the cross-correlation. The largest peak 302 is at a delay of 0-15 minutes. This implies that the rainfall has a near-immediate impact on the travel time.

Given the quantitative relationship between rainfall and traffic, the travel time may be modeled as a linear system, as shown by equation (3). The linear system has two components: the normal travel time $\bar{y}(t)$ and the contribution from the rainfall. The normal travel time $\bar{y}(t)$ is the historical average travel time at time t of the day. The rainfall contribution may be approximated by convolving the impulse response function h(τ) with the rainfall rate r(t).

$$y(t)=\bar{y}(t)+\int h(\tau)r(t-\tau)d\tau \qquad (3)$$

Figure 4:
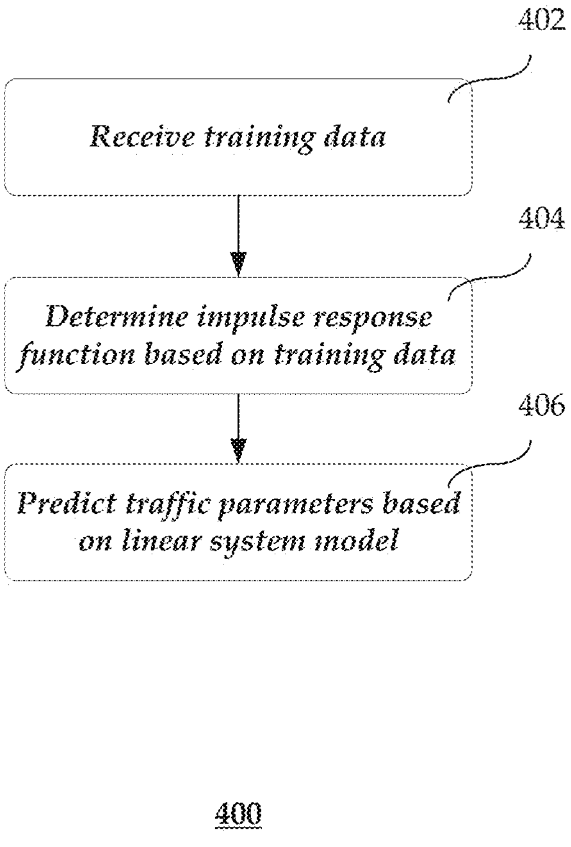
FIG. 4 shows an exemplary method for traffic prediction.

FIG. 4 shows an exemplary method 400 for traffic prediction. The method 400 may be performed automatically or semi-automatically by the system 100, as previously described with reference to FIG. 1. It should be noted that in the following discussion, reference will be made, using like numerals, to the features described in FIG. 1.

At 402, traffic prediction unit 122 receives training data. In some implementations, the training data includes historical traffic information and precipitation data collected over a period of time. The training data may be retrieved from an external data source, such as a publicly available data mine, website, weather radar images, sensor network, etc. Traffic information may include, for example, travel time data measured between two locations along a public road or freeway. Other types of traffic information, such as traffic speed, volume, etc., may also be provided. In some implementations, precipitation data includes rainfall data collected over the same period of time as the traffic information. Other types of precipitation data, such as snowfall, wind speed, fog, haze, temperature, etc., may also be used.

At 404, traffic prediction unit 122 determines an impulse response function h(τ) based on the training data. The impulse response function approximates the response of traffic to precipitation rate. More particularly, the impulse response function quantitatively relates the precipitation rate (e.g., rainfall rate) to a traffic parameter (e.g., travel time). To compute the impulse response function h(τ), Equation (3) may first be re-written and Fourier transform may be applied as follows:

$$\delta(t)=\int h(\tau)r(t-\tau)d\tau \qquad (4)$$

$$\Delta(f)=H(f)R(f) \qquad (5)$$

wherein h(τ) is the impulse response function, r(t−τ) is a precipitation rate, Δ is the Fourier transform of the travel time deviation δ, H is the Fourier transform of the impulse response function h, and R is the Fourier transform of the precipitation rate r.

After multiplying the complex conjugate value of R, equation (5) may be re-written to compute H as follows:

$$\Delta R^*=HRR^* \qquad (6)$$

$$H \approx \frac{G_{\Delta R^*}}{G_{RR^*}} \qquad (7)$$

Figure 5:
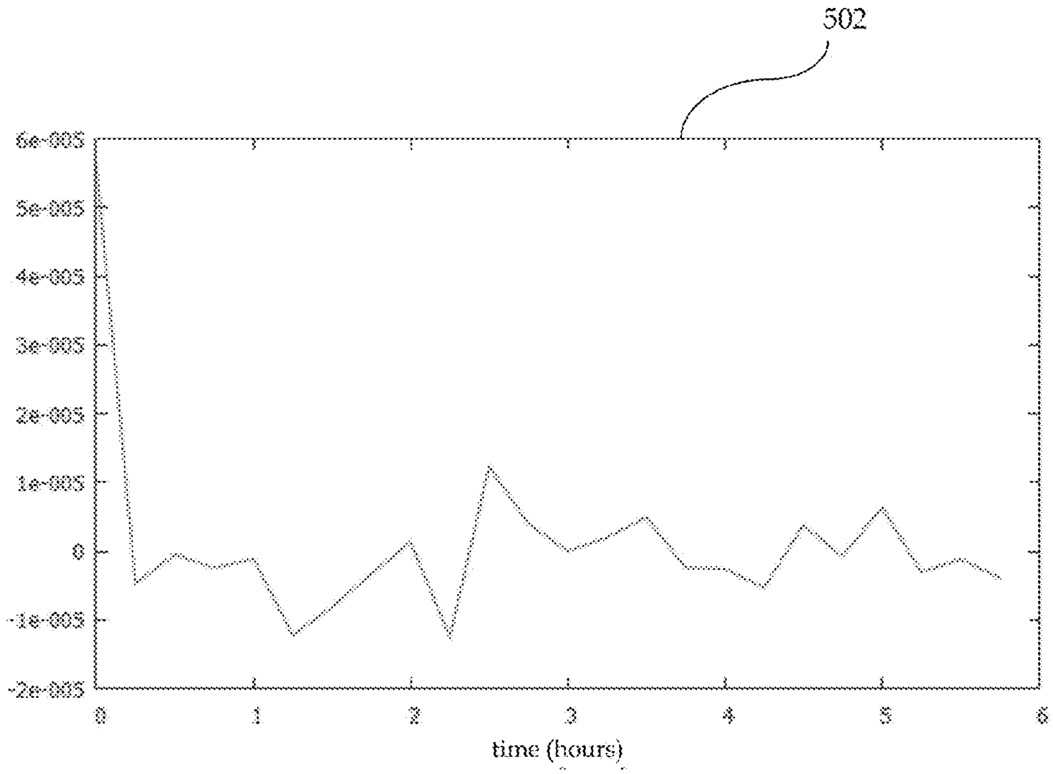
FIG. 5 shows an exemplary impulse response function.

The impulse response function h may then be approximated by the inverse Fourier transform of H, where $G_{\Delta R^*}$ and $G_{RR^*}$ are the power spectrum. FIG. 5 shows an exemplary impulse response function 502 derived from training data collected from a freeway.

Referring back to FIG. 4, at 406, traffic prediction unit 122 predicts one or more traffic parameters by calculating a weighted linear system model based on the impulse response function. The traffic parameter includes, for example, short-term travel time, speed, flow, occupancy, etc. The traffic parameter y(t) may be calculated using the following exemplary weighted linear system:

$$y(t)=\bar{y}(t)+\alpha\int h(\tau)r(t-\tau)d\tau \tag{8}$$

$$\alpha = \begin{cases} 0, & \text{if } \bar{r} \le \omega_1 \\ 0.5, & \text{if } \bar{r} > \omega_1 \text{ and } \bar{r} \le \omega_2 \\ 1, & \text{otherwise} \end{cases} \tag{9}$$

wherein $\bar{r}$ is the average precipitation rate used in the convolution, $\alpha$ is a weight parameter, $\omega_1$ and $\omega_2$ are empirically determined thresholds. By adding the weight parameter $\alpha$, the weighted linear system model is more tolerable to false contributions due to, for instance, short or light rain. It should be appreciated that other types of average precipitation rates $\bar{r}$, such as snowfall, hail or sleet, may also be used.

Figure 6:
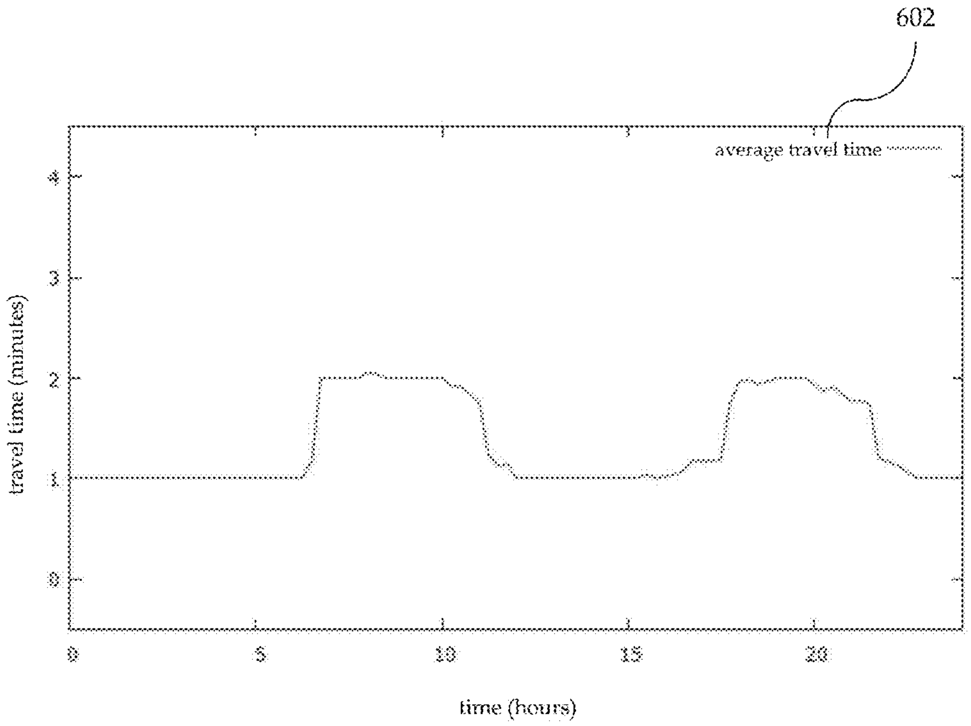
FIG. 6 shows a graph of the historical average travel time for a typical expressway segment on a weekday.

The present framework has been applied on training data collected in Singapore. The training data included travel time data collected at 5-minute intervals from eight expressways (AYE, BKE, CTE, ECP, KJE, PIE, SLE and TPE) over a time period from September 2013 to February 2014. Travel time was measured between consecutive exits of the expressway. In total, there were 183 segments of the expressway. The travel time data was published by the Land Transport Authority of Singapore on a public website (mytransport.sg). FIG. 6 shows a graph 602 of the historical average travel time for a typical expressway segment on a weekday.

The training data also included rainfall data collected for the same time period as the travel time data. The rainfall data was published by the National Environment Agency of Singapore on a public website (app2.nea.gov.sg). The rainfall data was derived from images acquired by weather radar, which were published at 5-10 minute intervals.

Figure 7:
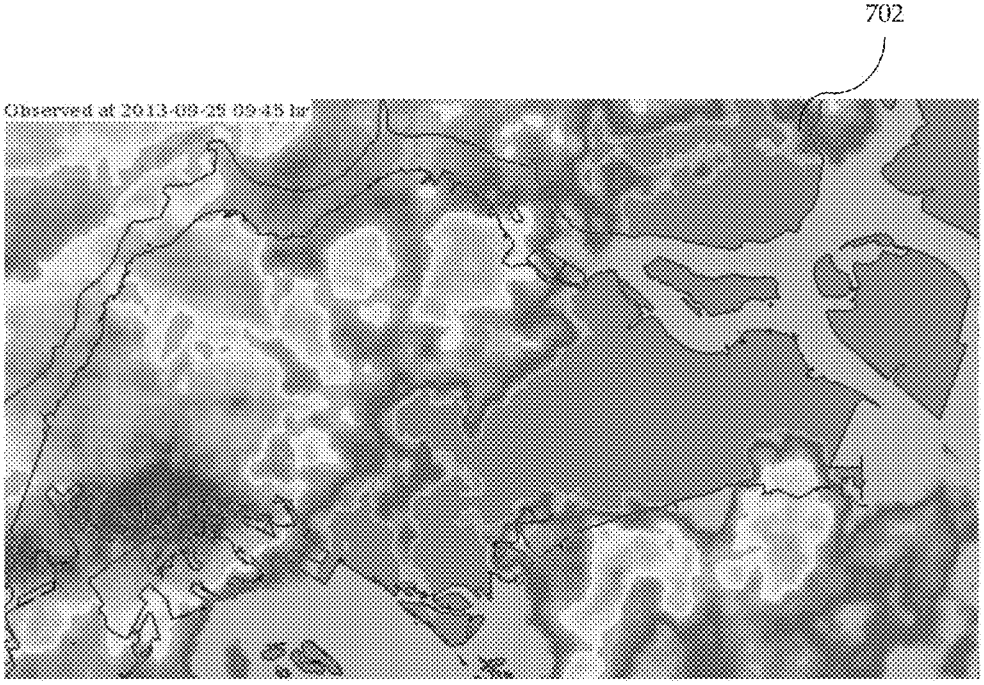
FIG. 7 shows an exemplary rainfall radar image map.

FIG. 7 shows an exemplary rainfall radar image map 702. Rainfall rate data may be reversely derived from the image 702 using the Doppler radar reflectivity as follows:

$$r = a\left(10^{\frac{d}{10}}\right)^b \tag{10}$$

wherein r is the rainfall rate, d is the reading taken from the image, a=0.097 and b=0.997 are empirically determined parameters. The rainfall rate corresponding to a particular expressway segment was approximated by the average rainfall rate in the area of this segment.

To predict the traffic parameters, the impulse response function was first derived from the training data. The impulse response function was computed for each segment of the expressways. After learning the impulse response functions, the present framework was applied to predict travel time given the rainfall data from December 2013 to February 2014. The prediction interval was 15 minutes, which was the maximum interval presented in the data collected.

The predicted travel time results were measured by the mean absolute percentage error (MAPE) and the root mean square error (RMSE), as follows:

$$MAPE = \frac{1}{N}\sum_{t=1}^{N}\frac{|y_t - \hat{y}_t|}{y_t} \tag{11}$$

$$RMSE = \sqrt{\frac{\sum_{t=1}^{N}(y_t - \hat{y}_t)^2}{N}} \tag{12}$$

wherein $\hat{y}_t$ is the predicted travel time at time t and $y_t$ is the actual travel time at time t.

Table 1 lists the final results averaged from the experiment results for all 183 expressway segments. The results were compared to three baseline prediction approaches: (1) random walk forecast, (2) historical average forecast and (3) smoothed historical average forecast. The first baseline prediction approach models traffic as random walk, then the forecast for the next state is simply the most recent state (i.e., $\hat{y}_{t+1}=y_t$). The second baseline approach predicts the next state by using previously observed historical average of the travel time (i.e., $\hat{y}_t=\bar{y}_t$). The last baseline approach calculates the prediction with a smoothing parameter (i.e., $\hat{y}_{t+1}=\mu y_t+(1-\mu)\hat{y}_t$ where $\mu=0.2$). These baseline approaches were applied to the same dataset and evaluated using the same measure. From the comparison shown in Table 1, it is clear that the proposed framework achieved better results with the lowest MAPE and RMSE.

TABLE 1

| Approach | MAPE | RMSE |
|---|---|---|
| Random walk forecast | 5.372% | 0.383 |
| Historical average forecast | 7.357% | 0.435 |
| Smoothed historical average forecast | 5.347% | 0.394 |
| Our proposed framework | 4.669% | 0.339 |

Figure 8:
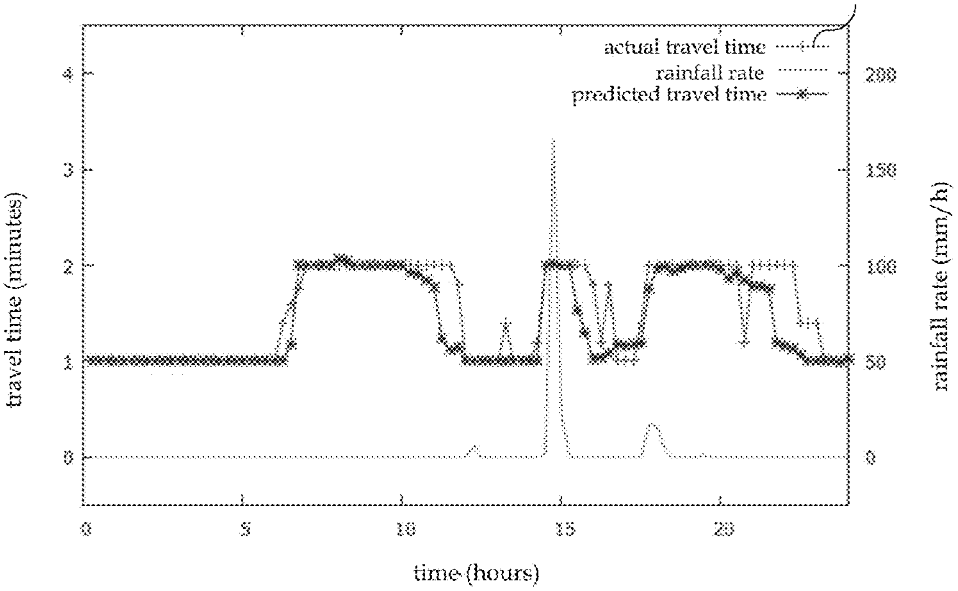
FIG. 8 shows two exemplary graphs of the predicted travel time versus the actual travel time plotted for one day.
Figure 8:
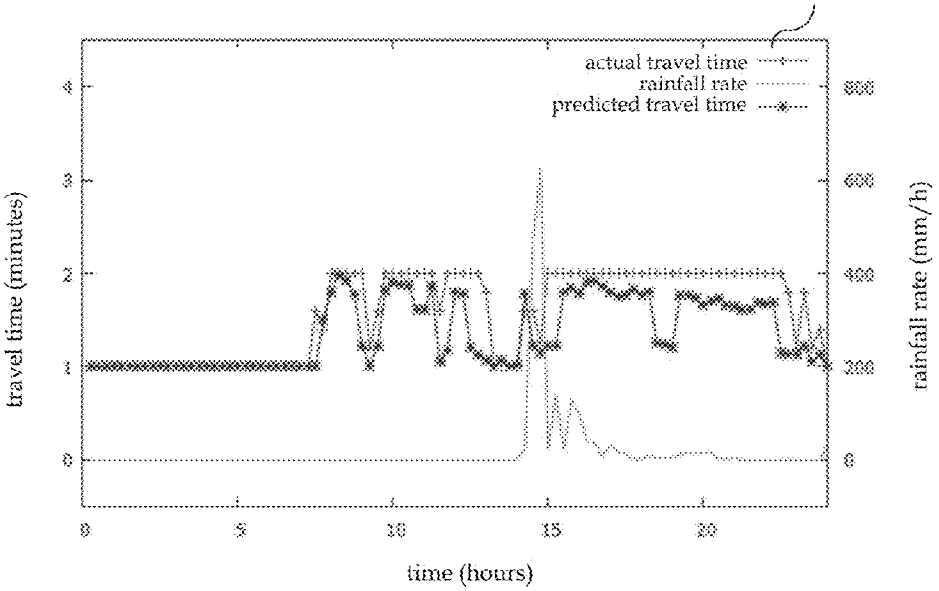

FIG. 8 shows two exemplary graphs 802 and 804 of the predicted travel time versus the actual travel time plotted for one day. It can be observed that the increase in travel time was effectively predicted for raining periods at off-peak hours.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of traffic prediction performed by a computer system, comprising:

receiving training data including historical traffic information and precipitation data;

determining an impulse response function based on the training data;

predicting one or more traffic parameters by calculating a weighted linear system model based on the impulse response function, wherein calculating the weighted linear system model comprises calculating $y(t)=\bar{y}(t)+\alpha\int h(\tau)r(t-\tau)d\tau$, wherein $\alpha$ is a weight parameter, $\bar{y}(t)$ is a historical average of travel time at time t of the day, $h(\tau)$ is the impulse response function and $r(t-\tau)$ is a precipitation rate; and graphically presenting the one or more predicted traffic parameters.

2. The method of claim 1 wherein the traffic information comprises travel time data.

3. The method of claim 1 wherein the precipitation data comprises rainfall data.

4. The method of claim 1 wherein the precipitation data comprises snowfall data.

5. The method of claim 1 wherein predicting the one or more traffic parameters comprises predicting travel time.

6. The method of claim 1 wherein the weight parameter comprises $$\alpha = \begin{cases} 0, & \text{if } \bar{r} \leq \omega_1 \\ 0.5, & \text{if } \bar{r} > \omega_1 \text{ and } \bar{r} \leq \omega_2 \\ 1, & \text{otherwise} \end{cases},$$

wherein $\bar{r}$ is an average precipitation rate, $\omega_1$ and $\omega_2$ are empirically determined thresholds.

7. A non-transitory computer-readable medium having stored thereon program code, the program code is executable by a computer to:

receive training data including historical traffic information and precipitation data;

determine an impulse response function based on the training data;

predict one or more traffic parameters by calculating a weighted linear system model based on the impulse response function, wherein the weighted linear system model comprises $y(t)=\bar{y}(t)+\alpha\int h(\tau)r(t-\tau)d\tau$, wherein $\alpha$ is a weight parameter, $\bar{y}(t)$ is a historical average of travel time at time t of the day, $h(\tau)$ is the impulse response function and $r(t-\tau)$ is a precipitation rate; and graphically present the one or more predicted traffic parameters.

8. The non-transitory computer-readable medium of claim 7 wherein the traffic information comprises travel time data.

9. The non-transitory computer-readable medium of claim 7 wherein the precipitation data comprises snowfall data.

10. The non-transitory computer-readable medium of claim 7 wherein the precipitation data comprises rainfall data.

11. The non-transitory computer-readable medium of claim 7 wherein the program code is executable by the computer to predict the one or more traffic parameters by predicting travel time.

12. The non-transitory computer-readable medium of claim 7 wherein the weight parameter comprises $$\alpha = \begin{cases} 0, & \text{if } \bar{r} \leq \omega_1 \\ 0.5, & \text{if } \bar{r} > \omega_1 \text{ and } \bar{r} \leq \omega_2 \\ 1, & \text{otherwise} \end{cases},$$

wherein $\bar{r}$ is an average precipitation rate, $\omega_1$ and $\omega_2$ are empirically determined thresholds.

13. A system comprising:

a non-transitory memory device for storing computer-readable program code; and a processor in communication with the memory device, the processor being operative with the computer-readable program code to:

receive training data including historical traffic information and precipitation data;

determine an impulse response function based on the training data;

predict one or more traffic parameters by calculating a weighted linear system model based on the impulse response function, wherein the weighted linear system model comprises $y(t)=\bar{y}(t)+\alpha\int h(\tau)r(t-\tau)d\tau$, wherein $\alpha$ is a weight parameter, $\bar{y}(t)$ is a historical average of travel time at time t of the day, $h(\tau)$ is the impulse response function and $r(t-\tau)$ is a precipitation rate; and graphically present the one or more predicted traffic parameters.

14. The system of claim 13 wherein the traffic information comprises travel time data.

15. The system of claim 13 wherein the precipitation data comprises rainfall data.

16. The system of claim 13 wherein the processor is operative with the computer-readable program code to predict the one or more traffic parameters by predicting travel time.

17. The system of claim 13 wherein the weight parameter comprises $$\alpha = \begin{cases} 0, & \text{if } \bar{r} \leq \omega_1 \\ 0.5, & \text{if } \bar{r} > \omega_1 \text{ and } \bar{r} \leq \omega_2 \\ 1, & \text{otherwise} \end{cases},$$

wherein $\bar{r}$ is an average precipitation rate, $\omega_1$ and $\omega_2$ are empirically determined thresholds.

* * * * *